3,052,556
PROCESS OF CANNING DRIED SOYBEANS AND THE RESULTING PRODUCT
Roland P. Baile, R.D. 5, Westminster, Md.
No Drawing. Filed Mar. 10, 1959, Ser. No. 798,324
2 Claims. (Cl. 99—186)

This invention relates to the processing of dried soybeans into edible and palatable products. More particularly, the invention relates to a novel process of so treating dried soybeans that the skin of the beans loses its characteristic rubbery and tough nature and becomes instead brittle and edible and easily removable, if removal is desired, and also results in the soybeans having a nut-like flavor brought out in them which makes them pleasant tasting.

The history of the soybean reveals that, despite the known wealth of nutritive value present in this cheaply produced bean, it has failed in acquiring any substantial acceptance or popularity as a food product for human consumption, the primary causes for this failure being the unpalatable taste plus a tough rubbery skin which in general has defied the prior attempts to soften or otherwise render same palatable.

Among such attempts, the most commonly tried on dried soybeans was that of soaking the beans in solutions of different substances, it being almost universally believed by those interested in the art that dried soybeans require soaking before they are cooked. This prior standard soaking procedure consumed from sixteen to twenty-four hours in most cases. Obviously, such is an expensive operation since the beans just stand for this substantial length of time using both space and equipment.

It has been proposed also to add various salts to the water for improved soaking. The addition of sodium chloride or ammonium salts, for example, has been helpful in some respects but such has never solved the problems of reducing the soaking time and/or brittlizing the skin of the bean. On the contrary, with such additions to the water, the soaking time still remains at about twenty-four hours, and even after this long soaking time, the skin remains tough and rubbery.

Further in regard to the skin, it may be desirable to remove the same from the meat of the bean. In explanation, for some uses the beans may possibly provide a better food combination with their skin removed but in such cases the removal of the skin poses quite a problem. Conventional scarifiers or dehullers satisfactory for other legumes are at best not too effective in removing the tough soybean skin; even after soaking for twenty-four hours it still tenaciously adheres intact to the skin, with the result that only after great diffculty and a time-consuming period are the scarifiers able to produce a skinless bean. As against this difficulty, numerous uses for the skinless bean are to be found in the making of nut butter, paste or flour, for example, and the skins themselves after removal have a variety of uses as in flour or animal feed.

In addition to the desirability of overcoming the disadvantages of the rough, rubbery skin, the art processed on the theory that improvement in the flavor of the soybean would be necessary in most instances. Consequently, many processes and solutions attempted to add a flavor thereto, but this artificial flavoring method was not satisfactory since the natural nut flavor of the bean is the most suitable and acceptable provided it were possible to bring out same.

Stated broadly, a principal object of the present invention is to provide a process of producing a platable product from dried soybeans in a simple and economical manner.

Another object of the invention is the provision of a method which eliminates from the skin thereof the tough, rubbery characteristic common to soybeans.

It is another object of the invention to devise a method of processing soybeans into foods acceptable for human consumption by which a time-consuming soaking practice is completely avoided as unnecessary.

Another important object of the present invention is the provision of a method of treating dried soybeans in such a way as to bring out the natural nut flavor of the bean.

A further object of the instant invention is to provide a novel method of treating dried soybeans that facilitates the removal of the skin of the bean.

Yet another object of the invention is the production of a soybean product which has great versatility in that it may be canned whole, or ground and made into a paste, a flour or nut butter, or merely stored until it is more desirable to make use of this novel product.

Another and more specific object of the invention is the provision of a method of treating dried soybeans utilizing an oil bath which brittlizes the skin thereof and permits it to be more readily removed as well as making it platable if permitted to remain, while further greatly reducing the preparation time for dried soybeans and also bringing out a nut flavor in the bean.

Additional and more specific objects will be apparent from a persual of the following detailed description of the invention and as defined in the appended claims.

In the production of soybeans according to the invention, any type of cleaned dried mature soybeans may be used. Among those used have been the Hawkeye, Clark, Wabash, Jackson and Mammoth Yellow varieties. Although it has been found that the instant invention is equally applicable to all types of soybeans, the Mammoth Yellow soybean is preferable because of its light yellow coloring. The other yellow-skinned beans as well as the black skin varieties, however, may be used.

Specifically, the novel processing as herein proposed consists in the treatment of dried uncooked soybeans in an oil bath at a temperature of from 80–300° F. for about 10–30 minutes. Such a bath has been found to have a marked effect upon the bean in that it permits the bean to be then cooked or skinned without further processing such as a long water-cooking. This oil treatment of dried uncooked, unpeeled soybeans according to the invention will of course be readily distinguished from cooking or frying or roasting processes which have previously been performed at higher temperatures and longer times on other food products such as peanuts. Rather, the instant treatment is a precooking treatment, which is neither long enough nor hot enough to cook the bean but, instead, substantially advantageously affects only the skin thereof.

In the above described treatment of soybeans according to the invention, numerous oils have been found suitable for the purpose of brittlizing the skin of the bean to make it palatable as well as removable, while also bringing out the nut-like flavor of the bean. Such oils as have been used include any edible oil such as the vegetable oils, coconut, corn, cottonseed, cocoa butter, olive, peanut and soybean. Animal oils such as lard oil and also mineral seal oil have been found to perform satisfactorily.

In general, it may be stated that there is a wide latitude in the temperatures at which the soybeans are processed prior to any cooking thereof. The times associated with certain temperatures may also be varied depending upon the coloration and/or use desired. For example, if the beans were cooked five minutes longer than the recommended 15-minute period at a temperature of 218°

F., the beans will turn a slightly darker brown color but still all the advantages of oil processing the soybeans will be retained.

After the soybeans have received the oil treatment, they may be processed in any number of ways, depending on the final product desired. That is to say, the treated beans now possess characteristics that permit a variety of uses thereof which were not possible or feasible in the past.

For example, if a product analogous to canned or baked (pea or navy) beans is desired, the beans are preferably pressure-cooked in cans with a sauce such as tomato, or they may be added to water or broth to make a bean soup. In regard to the canned product, it has been found to be most desirable to cook the oil-treated beans in the sealed can rather than in a large vat from which the cans might be filled for the reason that the increased handling involved in vat cooking and subsequent canning is not only more expensive but also may cause some of the skins to be removed, as is likely to present an unusually unsightly appearance in the final product which of course would be objectionable, particularly in a new commercial product such as canned or baked soybeans. To further explain, it has been found that after the soybeans have been hot-oil processed and then cooked, the skins of many of the beans are partially or entirely peeled off. The beans then are of two colors, light yellow, the color of the meat of the bean, or brown, the color of the darkened skin; or they are speckled, as when the skin is only partially peeled. Obviously also, cooking in the sealed can without any additional handling eliminates numerous steps involved in vat cooking and maintains the skin substantially intact.

Other than canning, the oil-treated beans have been found useful in making nut butter, nut paste or flour. For any such uses, the beans may be ground with or without the skins. If the skins are to remain, the beans are simply placed in the grinder, but if it is more desirable to remove the skins, the novel process of oil-treating the beans is of great advantage, since following the oil treatment the conventional scarifiers or dehullers can easily remove the brittlized skins, leaving the soybean meat which then may be ground into an appetizing paste or butter, or into a tasty flour.

To further emphasize the marked versatility of the soybean product resulting from the aforesaid oil treatment, it has been found that it is not even necessary or required that the beans as they come from the processing oil be immediately put in the cans, sealed, and then cooked under pressure in pressure-cookers. Of course, the principal advantage of putting the warm or hot beans as they come from the processing oil directly into the cans is that it permits a continuous plant operation and eliminates reheating of the beans, in contrast to the procedure involved if the beans are left to get cool and later put into cans, sealed and pressure-cooked. However, I have found that after the beans have been oil-processed and drained, they may be kept at a low temperature, i.e. 34° F. for a period of months, then put into cans along with water or sauce, sealed, and cooked as aforesaid with no noticeable flavor or appearance loss in the finished product, as compared to the usual process of putting the beans in cans while hot. This novel intermediate soybean product has also been kept as long as thirty days at a temperature of 70° F. Thus, the invention yields the advantage of being able to hold the beans in storage after coming from the oil treatment, thus to satisfy the need of the canner who may not be equipped to manufacture the nut-like paste, flour or butter and finds it necessary to send the oil-processed beans to another plant to have the product made, or whose canning plant equipment may be in use on other products and thus not available to handle the beans coming directly from the oil treatment.

By way of example only and not in a limiting sense, the following examples set forth in detail the novel process:

*Example I*

One pound of dried Mammoth Yellow soybeans was poured into a container of peanut oil at a temperature of 218° F. and allowed to remain therein for 15 minutes. The soybeans after being removed from the oil were inspected and found not to have swelled from their original size. They were somewhat darker in color than in the original state, the color being dependent to a large extent upon the length of time in which the soybeans are left in the oil. The heated soybeans are further characterized by the skin being (1) noticeably more brittle than in the untreated state to the extent that the skin may be readily rubbed off by the fingers, for instance; and (2) substantially less tough or rubbery, therefore making it more palatable. In addition, the hot-oil treatment brought out a desirable nut-like flavor in the soybean which was either unnoticeable or only slightly noticeable in the untreated bean, and not present in the bean soaked by the prior processes.

*Example II*

One pound of clear dried Mammoth Yellow soybeans was immersed in a soybean oil bath and maintained therein at about an 80° F. temperature for 30 minutes. The treated soybeans were then removed, examined and found to exhibit the same characteristics as the beans treated in Example I.

*Example III*

The same procedure as in Example I was followed except that a cottonseed oil bath at a temperature of 300° F. was used, with the soybeans remaining in contact with the hot oil for about 10 minutes.

*Example IV*

One pound of clean, dried Hawkeye soybeans was immersed in lard oil at a temperature of 150° F. and allowed to remain there for 25 minutes. Upon removal and examination, the beans were found to correspond in all substantial respects to the beans of Example I.

*Example V*

According to the manner of Example I, Wabash beans were treated in a corn oil bath at 250° F. for 12 minutes, and the satisfactory intermediate product as described in the prior example resulted.

*Example VI*

The soybean product of Example I after being taken from the oil was placed in a commercial can as used in the canning industry. The can was filled to approximately a third its volume with the hot-oil treated soybeans and then covered with a seasoned sauce, such as tomato sauce, up to approximately ⅛ inch from the top. The can was then sealed in the usual manner and processed in an atmosphere of 258° F. for 1 hour. The resulting product was an extremely palatable tomato sauce-soybean combination.

Although no specific examples thereof are herein given, it is to be understood that the intermediate products of the aforesaid Examples I–V, for example, are suitable for use in a variety of other ways than as set forth in Example VI. More particularly, said products with skin retained or removed (as by subjecting the oil-processed beans to the action of a scarifier or other suitable deskinner or dehulling equipment) may be ground into a meal or flour, or preferably to flake form to make, with the addition of a suitable vegetable oil, a paste or butter having the appearance and flavor or nut butter or paste. Also, the intermediate oil-processed beans products of Examples I–V may be used as such as an ingredient of such foods as chili con carne, etc. Or the aforesaid intermediate products may be stored as such for subsequent canning or shipped in bulk to a remote canner or processor who makes the final product.

When skin removal is practiced, the removed skins being high in food values may be used, for example, by grinding or otherwise reducing them to a meal or flour, to which operation the draining off of the oil therefrom lends itself admirable, or the dried skins as such may be used as an additive to animal feeds, for example.

It is also worthy of note that the beans may be processed in large batches, regardless of their subsequent use, thus affording the possibility of great economies. For example, one large batch of beans may be divided after the oil treatment, and some canned, some made into flour, and some made into butter, and the balance placed in storage for subsequent processing.

Moreover, from the above examples and the aforesaid description, it should be clear that the process is equally effective on most popular types of soybeans, thus lending itself to all the various localities which grow the different types.

As many changes could be made in carrying out the above processes without departing from the scope of the invention, it is intended that all matter contained in the above description shall be interpreted as illustrative and not in a limiting sense.

I claim:

1. The process of canning dried soybeans comprising the steps of placing dried, uncooked, unpeeled soybeans in oil heated to between about 80–300° F. for about 10–30 minutes as effects bringing out a nut-like flavor therein and embrittling the skin of said beans to the degree of rendering same palatable, removing said soybeans from the oil, thereupon placing said beans in a container, sealing said container, and cooking said soybeans in said sealed container.

2. The canned soybean product obtained by the process of claim 1.

References Cited in the file of this patent

UNITED STATES PATENTS

| | | |
|---|---|---|
| 1,912,895 | Gossel | June 6, 1933 |
| 2,267,747 | Plews | Dec. 30, 1941 |